United States Patent [19]

Finley

[11] 4,345,550
[45] Aug. 24, 1982

[54] DEFLECTING ROCKER ARM FOR AN INTERNAL COMBUSTION ENGINE

[76] Inventor: Donald G. Finley, 1658 Morse Dr., San Pedro, Calif. 90732

[21] Appl. No.: 148,315

[22] Filed: May 9, 1980

Related U.S. Application Data

[63] Continuation-in-part of Ser. No. 901,171, Apr. 28, 1978, Pat. No. 4,215,660.

[51] Int. Cl.³ .................... F02B 75/04; F02B 75/26
[52] U.S. Cl. ............................... 123/78 E; 123/48 B; 123/51 B; 123/58 BC
[58] Field of Search ............. 123/78 E, 78 BA, 78 A, 123/48 B, 48 A, 51 B, 51 BD, 51 BB, 58 BC, 58 B, 58 BB, 197 AC, 197 AB

[56]  References Cited

U.S. PATENT DOCUMENTS

| 1,443,719 | 1/1923 | Schott | 123/48 B |
| 1,914,707 | 6/1933 | Wolf | 123/78 A |
| 2,356,033 | 8/1944 | Criddle | 123/78 E |
| 2,816,416 | 12/1957 | French | 123/51 B |
| 3,004,810 | 10/1961 | King | 123/78 E |
| 4,111,164 | 9/1978 | Wuerfel | 123/78 E |

FOREIGN PATENT DOCUMENTS

| 230320 | 2/1959 | Australia | 123/58 BC |
| 600517 | 12/1959 | Italy | 123/58 BC |
| 570548 | 12/1975 | Switzerland | 123/78 BA |

Primary Examiner—Ira S. Lazarus
Assistant Examiner—Magdalen Moy
Attorney, Agent, or Firm—Nilsson, Robbins, Dalgarn, Berliner, Carson & Wurst

[57] ABSTRACT

A two-cycle, two-cylinder opposed piston internal combustion engine having means for continuously adjusting the stroke of the engine and the blocking and unblocking of intake, transfer and exhaust ports with respect to each other as the engine is operating. Corresponding pistons of each cylinder are connected to respective ends of pivotally mounted rocker arms so that pistons in one cylinder move oppositely with respect to pistons in the other cylinder, the piston side surfaces alternately blocking and unblocking transfer and exhaust ports. In a particular embodiment, the rocker arms are each fitted with a flat spring positioned so as to be in contact with the end of the associated piston rod and deflecting to allow the pistons to move apart at an increased speed in advance of the crankshaft. The springs are secured and limited so as to provide increasing spring moment as the springs are deflected. Two connecting rods are provided, one of which is attached at one end to each of the rocker arms at a pivot point distal from the rocker arm pivotal mount and at the other end to a rotatably mounted eccentric, one end of which is formed into a shaft containing a power drive gear operatively connected to a drive shaft, the eccentric being rotated due to an up and down motion of the connecting rod. Means are provided for continuously varying the attachment points of the connecting rods to the rocker arms, thereby altering the allowable pivotable movement of the rocker arm and consequently the stroke or maximum spaced-apart distance of the pistons in each cylinder. Also, the shaft portion of one of the eccentrics forms twisted splines on its outer surface, its associated power drive gear being adapted to mesh with the twisted splines so that the gear is rotated as it is longitudinally displaced along the shaft. Means are provided for continuously displacing this gear thereby changing the angular relationship between the two rocker arms, and thus the relative positioning of the pistons contained in each cylinder. This changed position alters the blocking of the exhaust ports with respect to the unblocking of the transfer ports. Also disclosed is a remote combustion chamber and a means for ensuring that the volume in which combustion takes place remains substantially constant during the combustion process.

4 Claims, 12 Drawing Figures

U.S. Patent Aug. 24, 1982 Sheet 3 of 3 4,345,550
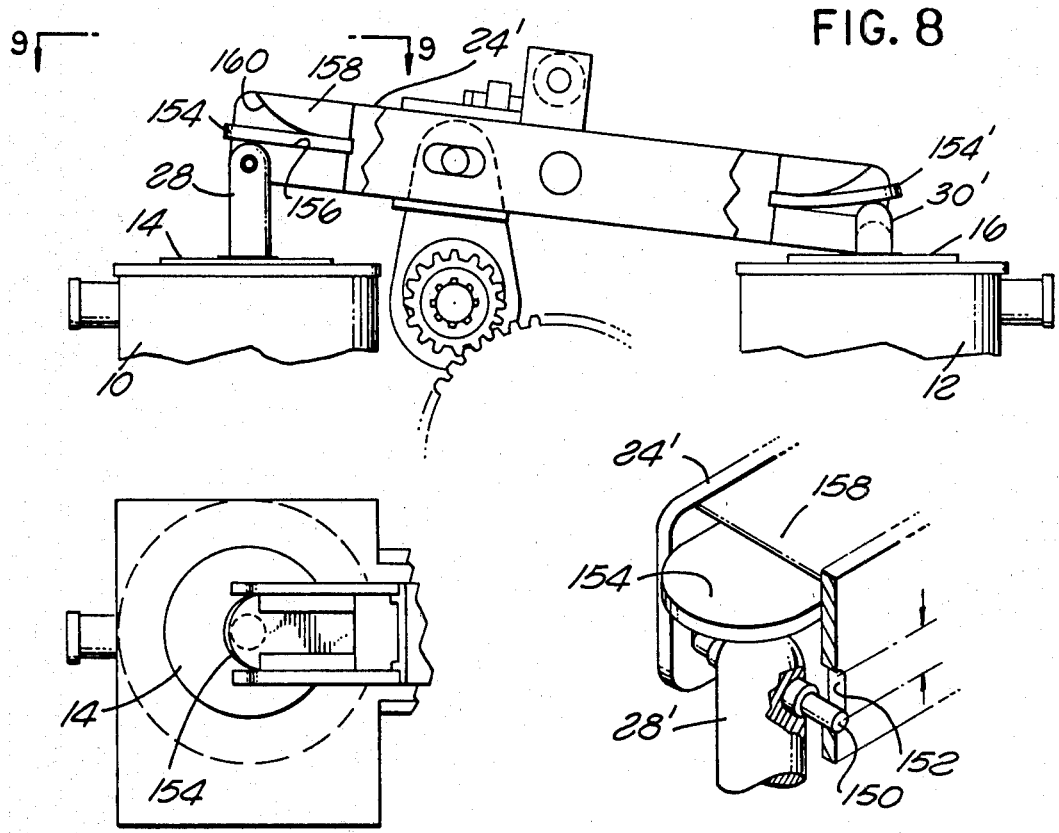
FIG. 8
FIG. 9
FIG. 10
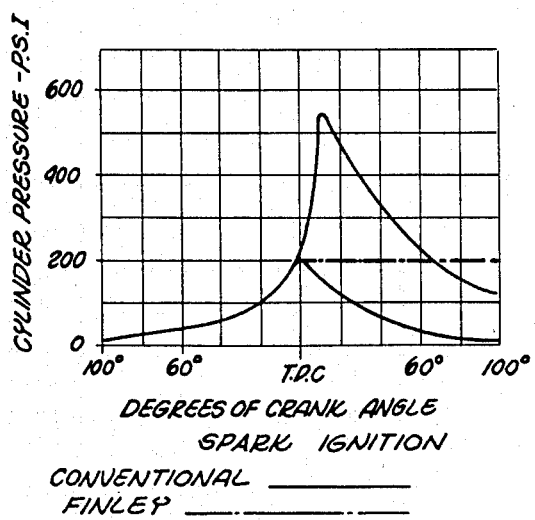
FIG. 11
DEGREES OF CRANK ANGLE
SPARK IGNITION
CONVENTIONAL _____
FINLEY _ _ _ _ _
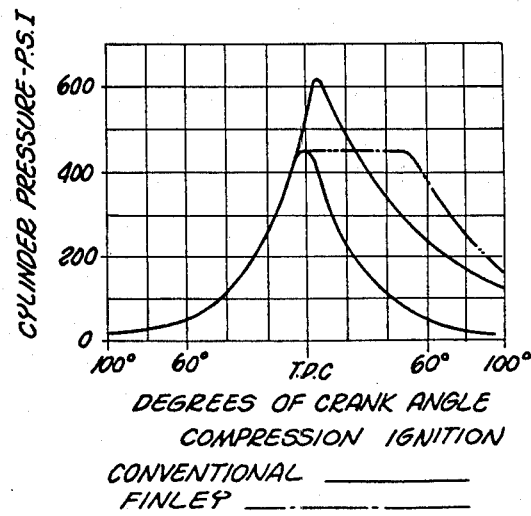
FIG. 12
DEGREES OF CRANK ANGLE
COMPRESSION IGNITION
CONVENTIONAL _____
FINLEY _ _ _ _ _

DEFLECTING ROCKER ARM FOR AN INTERNAL COMBUSTION ENGINE

CROSS REFERENCE TO RELATED APPLICATION

This application is a continuation-in-part of my application Ser. No. 901,171, filed Apr. 28, 1978 and now U.S. Pat. No. 4,215,660 entitled "Internal Combustion Engine".

FIELD OF THE INVENTION

The field of art to which the invention pertains includes internal combustion engines and, more specifically, two-cycle, opposed piston internal combustion engines.

BACKGROUND AND SUMMARY OF THE INVENTION

Two-cycle internal combustion engines are well known in the art and have been used for many and varied purposes. One specific variation of the two-cycle engine utilizes two cylinders each having first and second opposed pistons whose surfaces are moved together and apart to define a combustion chamber. The first pistons of each cylinder are operatively connected at opposite ends of a pivotally mounted rocker arm, the second pistons of each cylinder also being operatively connected to a second rocker arm. The sides of the pistons in such an engine alternately open and close input and transfer ports whereby air or an air/fuel mixture may be entered into the piston-defined combustion chamber and the combustion products removed therefrom. (Hereinbelow, reference to "air" will comprise an "air-fuel" mixture whenever appropriate.) However, the efficiency of conventional internal combustion engines varies as a function of engine r.p.m., manifold pressure, altitude, octane rating, and many other parameters. Consequently, engines are designed so that their peak efficiency occurs under certain predetermined conditions which are representative of anticipated or probable operating parameters. If the engine is operated under conditions different from this predetermined set of conditions, engine efficiency drops and the net effect is more fuel consumption.

Three basic factors contribute to reduced efficiency as the engine is operated under conditions apart from the predetermined conditions. The first factor is the closing of the exhaust port either too early or too late with respect to the opening of the transfer port. In a two-cycle engine, the exhaust port is opened prior to opening of the transfer port for pressure equalization, the opening of the transfer port then forcing combustion products out the exhaust port. As one can appreciate, an optimum time for closing the exhaust port would be at the moment when the incoming air just reaches the exhaust port and has forced the last of the combustion products out through the exhaust port. If the exhaust port is closed prematurely, all of the prior combustion products will not be expelled, whereas if it is closed too late, some of the fuel within the air will be wasted. In conventional engines, this optimum closing of the exhaust port only occurs under one set of operating conditions. Another factor contributing to reduced efficiency in conventional engines is that the stroke, that is the maximum distance apart the pistons attain, is fixed. As is well known, the stroke determines the compression ratio of the engine, that is, the ratio of the pressure internal to the combustion chamber at the time of combustion with respect to the outside or manifold pressure. Therefore as the outside pressure decreases below an assumed design pressure due to a reduced throttle setting, increased engine speed, or increased altitude, the pressure in the combustion chamber at the time of combustion decreases. This lower pressure results in a less than optimum fuel burning efficiency. A third factor contributing to reduced efficiency in combustion engines is a change in volume of the combustion chamber during combustion, the change occurring because of piston travel during the combustion process. This volume change affects the efficiency of combustion and results in a less efficient use of the fuel. All of the above disadvantages of conventional engines combine to define an engine having less overall fuel efficiency than that potentially achievable.

The present invention provides a two-cycle, opposed cylinder internal combustion engine which is more efficient than any conventional engine. The engine consists of a pair of cylinders each of which has first and second pistons that act oppositely in a predetermined phase relationship so that their facing surfaces are moved together and apart to define a stroke length and to at least partially define a combustion chamber. Also the piston side surfaces alternately block and unblock transfer ports and exhaust ports as they move together and apart. Means are provided for providing fuel to the combustion chamber through the transfer ports or for injection directly into a remote combustion chamber. A pivotally mounted first rocker arm is provided, the arm having opposite ends connected to a first piston in each cylinder for reciprocal movement thereof. A means connected to the second pistons for reciprocal movement thereof is also provided, in a specific embodiment the means being a second rocker arm.

In a particular embodiment, a spring member is interposed between the rocker arm and the piston. More specifically, the rocker arms are each fitted with a spring, preferably a flat spring, positioned so as to be in contact with the end of the associated piston rod and deflecting to allow the pistons to move apart at an increased speed in advance of the crankshaft. The springs are secured and limited so as to provide increasing spring moment as the springs are deflected. This gives rise to a substantial reduction of maximum firing pressure and flattening and extension of cylinder pressure over a wide range of crank angles. Increased thermal efficiency and reduced mechanical friction result in substantially increased Brake Mean Effective Pressure (BMEP).

Two connecting rods are provided, one of which is rotatably attached at one end to each of the rocker arms at a pivot point distal from the rocker arm pivotal mount, and at the other end to a crankshaft which in a specific embodiment is an eccentral containing a power drive gear operatively connected to a drive shaft. The eccentric and power drive gear rotate as the connecting rod pivot point moves up and down due to oscillation of the rocker arm about its pivot point. The second rocker arm is similarly configured. The previously described disadvantages of conventional engines are minimized in an engine of the present invention which provides means for continuously varying the stroke or maximum spaced apart distance of the first and second pistons in each cylinder in accordance with changes in a predetermined performance parameter of the engine, a means for continuously varying the positional relationship of the first piston with respect to the second piston so that blocking an exhaust port by the second piston with respect to the unblocking of a transfer port by the first piston can be altered in accordance with a predetermined engine performance parameter, and a means for defining a combustion chamber which maintains a substantially constant volume during combustion.

The stroke of the engine is adjusted by providing a means for continuously varying during engine operation the pivot point at which each connecting rod is attached to its respective rocker arm, the point of attachment determining the allowable pivotal movement of the rocker arm and thereby the maximum spaced-apart distance of the first and second pistons in each cylinder. By varying the rocker arm pivot point in accordance with engine manifold pressure, a means for compensating for changes in external pressure in order to achieve a predetermined pressure within the combustion chamber at the time of combustion is possible. In addition, the invention discloses a means for manually adjusting the stroke also as the engine is operating, thereby allowing an operator to adjust for differing gasoline octane ratings.

Means for continuously varying the positional relationship of the first piston with respect to the second piston comprises one of the eccentrics forming a shaft having twisted splines on its outer surface, its associated power drive gear being adapted to mesh with the twisted splines so that as the gear is longitudinally displaced along the shaft, it will rotate in accordance with the twisted splines. In operation, as the power drive gear is displaced on the splined shaft, the shaft itself is forced to rotate thereby causing its associated rocker arm to pivot, the other rocker arm remaining stationary. Means are provided to control the longitudinal positioning of the power drive gear on the splined shaft as a function of engine r.p.m., thereby ensuring that the exhaust ports will be closed at the proper time with respect to the arrival of the input air. In addition, the phasing of the first rocker arm with respect to the second rocker arms is chosen so that during the time of combustion both first and second piston surfaces are traveling in substantially the same direction at the same velocity. This ensures that during the time of combustion, the combustion chamber volume is substantially constant.

A remote combustion chamber is also disclosed, the chamber incorporating means whereby direct fuel injection, spark plug ignition or compression ignition can be utilized.

BRIEF DESCRIPTION OF THE DRAWINGS

FIG. 8 is a sectional, somewhat exaggerated in part, elevational view of the top portion of an engine of this invention in accordance with a particular embodiment;

FIG. 9 is a top view of the engine taken along line 9—9 of FIG. 8;

FIG. 10 is a perspective view of an end of one of the rocker arms of the engine of FIG. 8, cut-away to show its connection and relationship to the associated piston rod;

FIG. 11 is an idealized pressure curve for a spark ignition engine showing cylinder pressure versus crank angle for a conventional engine and for an engine incorporating the rocker arm of FIG. 8; and FIG. 12 is a similar pressure curve for a compression ignition (diesel) engine.

DETAILED DESCRIPTION

As previously explained, the invention discloses a two-cylinder, opposed piston, two-stroke internal combustion engine in which both the stroke of and phase relationship between two pistons contained within each cylinder piston pair can be varied during engine operation in accordance with various engine performance parameters. In addition, the invention provides the means by which a combustion chamber volume is maintained substantially constant during the combustion process. These three features allow the engine to operate with an efficiency heretofore unobtainable by conventional internal combustion engines. In accordance with an improved embodiment, spring means are provided to deflect the rocker arms of the engine during a power stroke to reduce firing pressure.

Initially, and with reference to FIGS. 1-7, a form of the engine which does not have the spring deflection feature will be described. Thereafter, with reference to FIGS. 8-12, the improved embodiment will be described.

Figure 2:
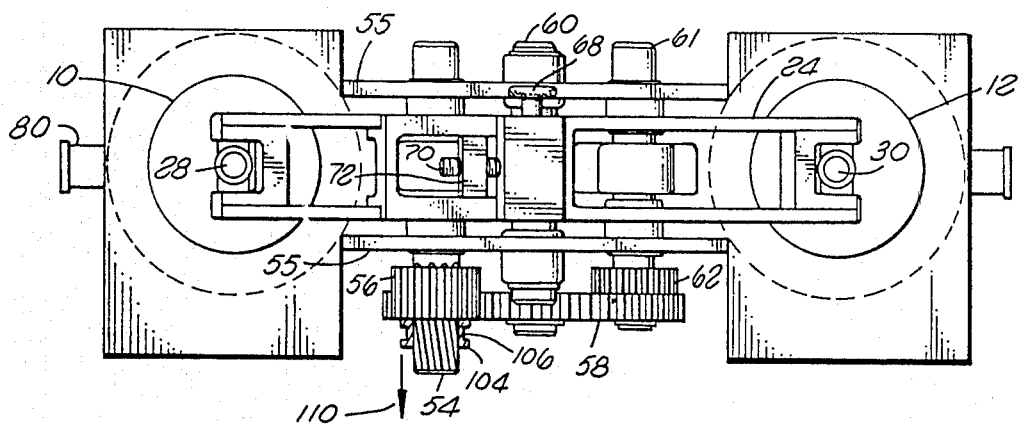
FIG. 2 is a top view of the internal combustion engine taken along line 2—2 of FIG. 1.
Figure 1:
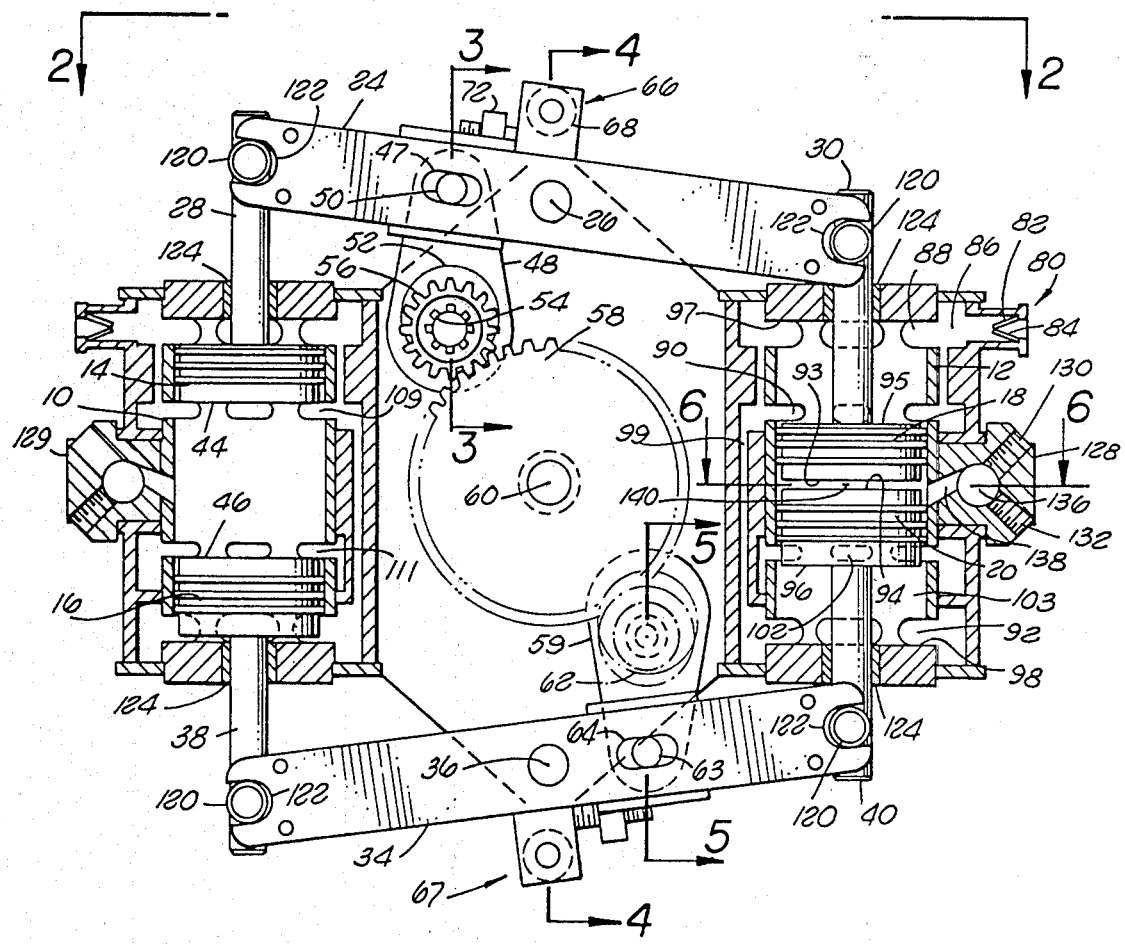
FIG. 1 is a sectional elevational view of a two-cycle, opposed piston internal combustion engine according to the present invention.

The basic elements of the engine can be seen in FIGS. 1 and 2. The engine consists of a left cylinder 10 and a right cylinder 12, the left cylinder containing a first piston 14 and a second piston 16 and the right cylinder 12 containing a first piston 18 and a second piston 20. A first or upper rocker arm 24 pivots about an upper pivot point as shown at 26, the ends of the upper rocker arm 24 being connected to the first pistons 14 and 18 through corresponding piston rods 28 and 30. In a similar manner, a second or lower rocker arm 34 pivots about a lower pivot point as shown at 36 and is connected to the second pistons 16 and 20 through corresponding piston rods 38 and 40. Thus one can appreciate that as the first and second pistons 14 and 16 of the left cylinder 10 move apart, the first and second pistons 18 and 20 of the right cylinder 12 necessarily move together due to the pivoting action of the upper and lower rocker arms 24 and 34. Thus a power stroke driving apart the first and second pistons 14 and 16 of the left cylinder 10 will provide some of the force necessary to effect a compression stroke by the first and second pistons 18 and 20 of the right cylinder 12. The length of a stroke, that is the maximum distance apart that the internal face 44 of the first piston 14 achieves in relation to the internal face 46 of the second piston 16, is determined by the angular travel of the upper rocker arm 24 and the lower rocker arm 34. Therefore, if this angular travel is restricted, a shorter stroke will be effected and if the angular travel is relaxed, a longer stroke will be effected. Also, if the angular relationship between the first rocker arm 24 and the second rocker arm 34 is changed, then the relative motion of the first arm 14 with respect to the second piston 16 will be altered. This relative motion will then alter the positioning of the internal faces 44 and 46 of the left cylinder pistons 14 and 16 with respect to transfer and exhaust ports as will be explained below, thereby providing a means for altering the opening and closing of these ports.

Figure 3:
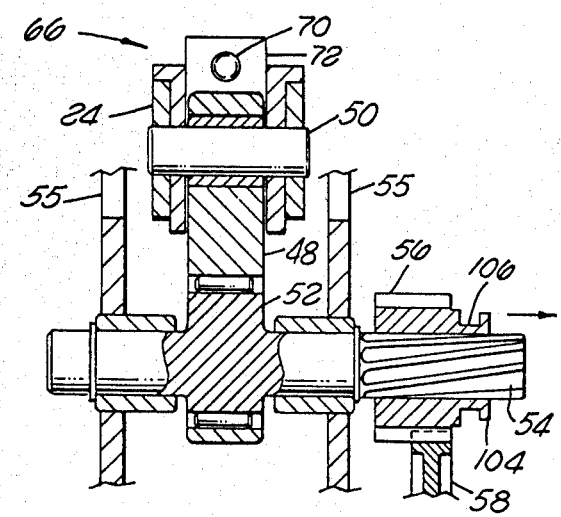
FIG. 3 is a cross sectional view taken along line 3—3 of FIG. 1 showing the eccentric and its associated twisted splined shaft.
Figure 5:
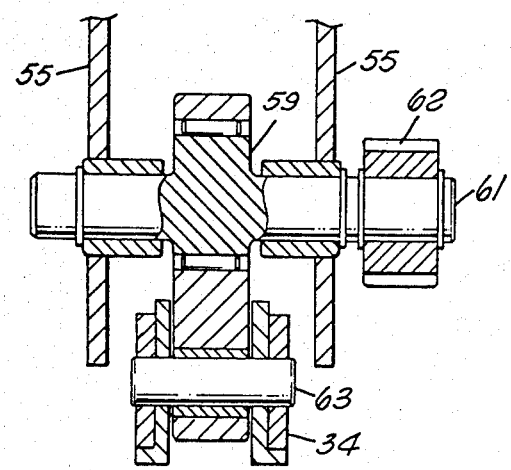
FIG. 5 is a cross sectional view taken along line 5—5 of FIG. 1 showing the second stroke adjustment assembly.
Figure 4:
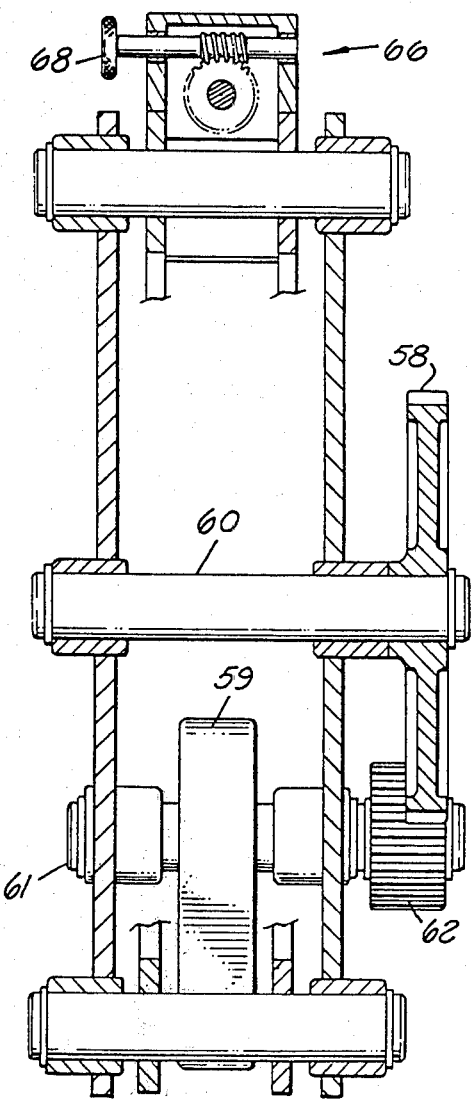
FIG. 4 is a cross sectional view taken along line 4—4 of FIG. 1 showing the clutch boss gear and its interface with the second power drive gear.

As previously stated, the stroke in both the left cylinder 10 and right cylinder 12, can be varied by controlling the pivotal angle through which the upper rocker arm 24 and lower rocker arm 34 can rotate. With respect to the pivotal rotation of the upper rocker arm 24, elongated slots 47 are provided in the left half of the rocker arm 24, the slots 47 being oriented so that their longitudinal axes are parallel to the longitudinal axis of the rocker arm. Referring to FIG. 3 in conjunction with FIGS. 1 and 2, an upper or first connecting rod 48 is rotably attached to a cross member 50, both ends of which extend through and are supported by the elongated slots 47. The lower end of the connecting rod 48 is rotatably connected to an eccentric 52 one end of which forms a twisted splined shaft 54, the eccentric 52 being rotatably secured by parallel mounting plates 55 so that it maintains a fixed relationship with respect to the upper rocker arm pivot point 26. Slidably received on the twisted splined shaft 54 is a power transfer gear 56 which is in meshing contact with a clutch boss gear 58, the rotation of which turns a drive shaft 60 extending through the center of the engine. As the upper rocker arm 24 rotates about its pivot point 26, the up and down motion of the upper connecting rod 48 in conjunction with the eccentric 52 will cause the twisted splined shaft 54 to rotate. The use of the eccentric 52 provides an action similar to that of the axially offset connecting rod attachment surfaces in a crankshaft of a conventional engine. In a similar manner, as further shown in FIGS. 5 and 6, power is transferred from the lower rocker arm 34 through a lower connecting rod 59 to also drive the clutch boss gear 58. It should be noted that the shaft 61 on which a lower power transfer gear 62 is mounted does not have twisted splines as does the upper shaft 54, for reasons that will be explained below.

Referring again to the upper rocker arm 24, it can be seen that its angular travel will be determined by the length of the connecting rod 48 and the position of the cross member 50 in the elongated slots 47. As the cross-member 50 is repositioned within the elongated slots 47, the allowable angular travel of the upper rocker arm 24 will also vary, thereby changing the stroke of both the left cylinder 10 and the right cylinder 12. The limit over which this variance can occur is determined by the length of the elongated slots 47. Thus as one can appreciate, adjusting the position of the cross member 50 within its associated elongated slots 47, while at the same time adjusting the position of a lower cross member 63 in its corresponding elongated slots 64, both adjustments being effected while the engine is operating, will allow the stroke of each piston pair 14 and 16, and 18 and 20 to be continuously adjusted without changing the relative phase relationship between each piston pair. To effect this positioning, an upper stroke adjustment assembly 66 and an identical lower stroke adjustment assembly 67 are provided. Referring to the upper stroke adjustment assembly 66 for purposes of explanation, the adjustment can be effected in two ways, either by manually turning a control knob 68 or by rotating an adjustment bolt 70 which is in threaded contact with a holding bracket 72 attached to the upper rocker arm 24. Rotation of the adjustment bolt 70 or the control knob 68, will move the upper stroke adjustment assembly, thereby moving the cross member 50 within the elongated slots 47. In an operative engine, the control knob 68 could be mechanically coupled to a control knob in an automobile dashboard, and the threaded bolt 70 could be controlled automatically by any one of several engine performance parameters, examples of which include intake manifold pressure, engine speed, temperature, etc. Many devices for controlling the adjustment bolt 70 are well known in the art, one example of which could be a mechanical governor. In a similar manner, although not explained in detail, the lower stroke adjustment assembly 67 is simultaneously adjusted in accordance with adjustments to the upper stroke adjustment assembly 66, the assemblies 66 and 67 working together to change the stroke of the engine without changing the phasing of the pistons within each cylinder.

Referring to the right cylinder 12 for illustrative purposes, intake air is drawn into the engine through a reed valve 80 in which the two inwardly slanting reeds 82 and 84 open outwardly to allow air to flow therethrough, the opening occurring when the pressure in the volume 86 internal to the reed valve 80 is less than the pressure external to the reed valve 80. However, as the pressure internal to the reed valve 80 exceeds the external pressure, then the reeds 82 and 84 seal against each other thereby preventing air from escaping back out through the valve 80. This type of valve is widely utilized in the fluid transfer art. Internal to the cylinder 12, an upper ring of air intake ports 88, a ring of transfer ports 90 and a lower ring of air intake ports 92 are provided. All air entering between the first piston 18 and second piston 20 internal faces 93 and 94 respectively must pass through the transfer ports 90. The upper air intake ports 88 and lower air intake ports 92 allow air to be drawn into the cavities created between the pistons 18 and 20 external surfaces 95 and 96 and the cylinder ends 97 and 98, the cavities being created as the pistons 18 and 20 move together. As the pistons 18 and 20 move apart, this air is compressed, the air in both volumes being connected via a transfer duct 99. As the pistons 18 and 20 continue to move apart, the air pressure continues to increase, the reed value 80 being closed as previously explained until the internal face 93 of the first piston 18 rises above the transfer ports 90.

A ring of exhaust ports 102 is provided between the lower ring of air intake ports 92 and transfer ports 90. It is essential that the second piston 20 be of sufficient length that the exhaust ports 102 are always sealed from the cavity 103 directly below the second piston 20, thereby ensuring that combustion products will not contaminate input air. As the first and second pistons 18 and 20 move apart, the exhaust ports 102 open as a result of the second piston 20 moving downwardly. After the exhaust ports 102 open, an influx of pressurized air present at the transfer ports 90, as previously explained, forces the combustion products out through the exhaust ports 102. It is desirable that all of the combustion products, but none of the input air, escape through the exhaust ports 102.

Having thus explained operation of the pistons 18 and 20 in conjunction with the air input, transfer and exhaust ports 88, 92, 90 and 102, a further aspect of the invention can be appreciated. Referring again to FIGS. 1 and 2, one can appreciate that if the angle of one of the rocker arms 24 or 34 can be changed without changing the angle of the other rocker arm, then the closing of the exhaust ports 102 with respect to the opening of the transfer ports 90 can be varied. A means to vary closing of the exhaust ports 102 with respect to the time the transfer ports 90 are open would allow a more efficient engine operation as operating parameters change, the closing being regulated by any one of several engine performance parameters such as manifold pressure or engine r.p.m. As previously explained, a twisted spline shaft 54 is formed at one end of the eccentric 52. Slidably mounted on the twisted splined shaft 54 is a power transfer gear 56 which mates with the clutch boss gear 58. Referring now specifically to FIGS. 2 and 3, an adjustment collar 104 is formed as part of the power transfer gear 56. A positioning fork, not shown, mates with an annular ring 106 in the adjustment collar 104. As the positioning fork which is in sliding contact with the angular ring 106 moves outwardly as indicated by the arrow 110, the twisted splining of shaft 54 causes the upper connecting rod 48 to be repositioned due to rotation of the eccentrically formed twisted splined shaft 54 induced by movement of the power transfer gear 56. Thus, as the shaft 54 is rotated due to a change in the lateral positioning of the power transfer gear 56, the upper rocker arm 24 angle with respect to the lower rocker arm 34 angle is changed. As this angular change is effected, one can appreciate, by referring to the position of the first piston 14 in the left cylinder 10, that the position of its internal face 44 will change with respect to the transfer ports 109 without any change in the position of the second piston 16 internal face 46 with respect to the exhaust ports 111. Thus as the lateral positioning of the power transfer gear 56 is changed the opening and closing of the transfer ports 90 with respect to the opening and closing of the exhaust ports 102 is changed. As the power transfer gear 56 is moved inwardly and outwardly during engine operation, the phase relationship of the upper rocker arm 24 with respect to the lower rocker arm 34 is continuously varied. Means for positioning the gear 56 in accordance with any of a various number of engine parameters are well known in the art. As can be seen by reference to FIG. 4, a lower power transfer gear 62 which is operatively connected to the lower rocker arm 34 by the lower connecting rod 60 also drives the clutch boss gear 58. However, the shaft 61 on which the lower power transfer gear 62 is mounted is not splined as was the shaft 54 for the upper power transfer gear 56 because all of the necessary phase relationship changes can be effected by positioning only the upper power transfer gear 56.

A needle bearing 120 is provided at the top of each piston rod 28, 30, 38 and 40, each needle bearing being positioned in a notch 122 at each end of the upper and lower rocker arms 24 and 34. The notch 122 is important because each piston rod is fixedly attached to its respective piston, thereby resulting in a slight lateral movement with respect to the end of the rocker arm as the rocker arm pivots. Each piston rod in turn is positioned by an insert bearing 124 provided at each end of the cylinders 10 and 12.

Figure 6:
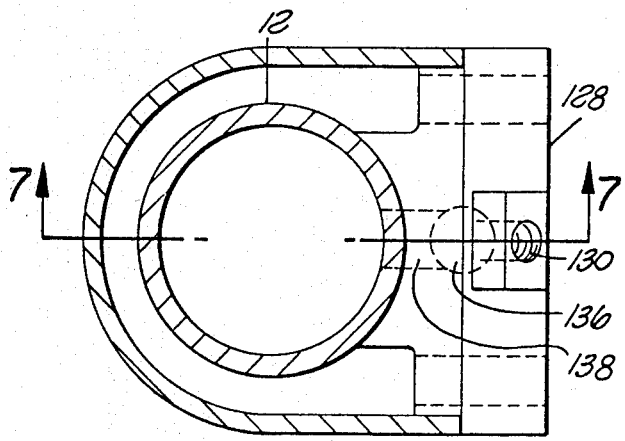
FIG. 6 is a cross sectional view taken along line 6—6 of FIG. 1 showing the cylinder and its relationship to the remote combustion chamber.
Figure 7:
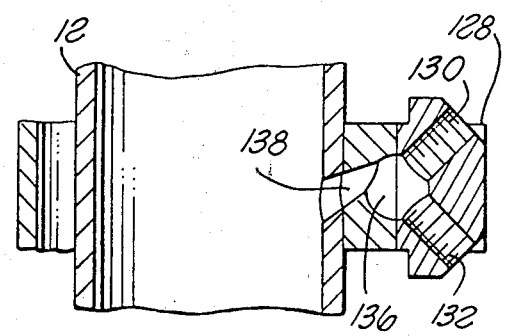
FIG. 7 is a cross sectional view taken along line 7—7 of FIG. 6 showing the remote combusiton chamber.

Referring to the FIGS. 1, 6 and 7, each of the cylinders has a remote combustion chamber 128 and 129. For purposes of explanation, the right cylinder remote combustion chamber 128 will be discussed, the left cylinder combustion chamber being identical in operation. The remote combustion chamber can accommodate an engine utilizing fuel injection in conjunction with spark plug ignition, spark plug ignition in conjunction with an air/fuel mixture entering through the transfer ports, and diesel operation in which fuel is ignited through compression heat. To achieve these various modes of operation, the remote combustion chamber has a first threaded orifice 130 for receiving a fuel injecting insert (not shown) and a second threaded orifice 132 for receipt of an igniting device such as a spark plug (not shown). Combustion occurs in a spherical cavity 136 contained within the remote combustion chamber 128, a connecting channel 138 leading from the spherical chamber 136 to the inside of cylinder 12, and the volume 140 defined by the internal faces 93 and 94 of the first and second pistons 18 and 20. The phasing of the upper rocker arm 24 with respect to the lower rocker arm 34 is chosen so that at the moment of ignition, and throughout the fuel burning process, the first piston 18 and second piston 20 are both moving in the same direction. Thus the volume 140 between the pistons remains substantially constant throughout the burning process. With this volume relatively constant, and the volume of the spherical cavity 136 and the connecting channel 138 being fixed, then one can readily see that the total combustion volume does in fact remain substantially constant throughout the burning process, whereas in a conventional internal combustion engine movement of a single piston as a result of the burning process results in the combustion volume changing prior to the fuel being completely burned. The connecting channel 138 is angled downwardly and off center from the spherical cavity 136 to the piston-enclosed volume 140. This downward angling establishes a swirling motion in the volume 140 thereby increasing fuel-burning efficiency therein.

In operation, an engine according to the present invention has a stroke and transfer and exhaust port phasing which can be automatically varied in accordance with various engine operating parameters, thereby allowing it to be operated at near maximum efficiency under all conditions rather than at an assumed set of design conditions as with conventional engines. Referring to FIG. 1, as the first piston 18 and second piston 20 of the right cylinder 12 move towards each other, air, which could comprise an air/fuel mixture, is drawn through the reed intake valve 80 and into the upper intake ports 88, and lower intake ports 92, while at the same time compressing air supplied through the transfer ports 90. After combustion, the air entering through the upper and lower intake ports 88 and 92 is compressed as previously explained as the pistons 18 and 20 move apart. As the first piston 18 reaches the position shown in the left cylinder 10, the compressed air is forced through the transfer ports 90 into the volume partially defined by the first piston internal face 93 and the second piston internal face 94. At this time the second piston 20 is in the position shown for the second piston 16 in the left cylinder 10, thereby opening the exhaust ports 102. The compressed air entering through the transfer ports 90 forces the combustion products inside the cylinder out through the exhaust ports 102. Positioning of the second piston 16 is controlled by the lower rocker arm 34 so that the exhaust ports 102 will be blocked just as a wave of air entering through the transfer ports 90 reaches them. The transfer ports 90 remain open after the exhaust ports 102 are closed for maximum cylinder charging. Thus one can appreciate that this opening and closing of the exhaust ports 102 with respect to the transfer ports 90 will vary as a result of engine operating conditions. For example, the ratio of time it takes incoming air to travel from the transfer ports 90 to the exhaust ports 102 with respect to the time of a compression/combustion cycle will vary as a function of engine r.p.m. Thus the angle of the upper rocker arm 24 with respect to the angle of the lower rocker arm 34 must be continuously adjusted if maximum engine efficiency is to be achieved. The invention provides a means for continuously effecting this adjustment by changing the lateral position of the power transfer gear 56 on the twisted splined shaft 54 in accordance with engine r.p.m.

In addition, it can be appreciated that pressure exerted on the incoming air as a result of the piston movement is determined by the stroke of the engine, a longer stroke providing more highly pressurized air at the transfer ports 90. As already explained, the invention provides a means for continuously varying the stroke as the engine is operating by positioning of the cross-members 50 and 63 in each of the rocker arm elongated slots 47 and 64, respectively. Thus, the stroke is increased to compensate for the loss of air mass due to reduced throttle settings. Also, as previously explained, the invention provides for a manual adjustment of the stroke through the control knob 68 which can be manipulated from the dashboard of a car. Thus, an operator can vary the compression ratio of the engine to accommodate any octane or cetane rated fuel. Also as previously explained, the remote combustion chamber 128 is fitted to receive both a fuel injector fixture or a spark plug. This allows the engine to function either as a spark ignition or a compression ignition engine.

Advantages of the above described engine include a means for automatically varying the phasing of each piston in order to compensate for sluggishness of fuel flow occasioned by increasing engine speeds. Also both the air incoming through the transfer ports 90 and the combustion products outgoing through the exhaust ports 102 are transferred at the point in the piston travel where piston movement per degree of crankshaft rotation is at a minimum. Thus, the transfer ports and the exhaust ports are open a maximum possible time for the minimum possible piston movement. Also since the exhaust piston leads the intake piston, the intake piston is moving in the same direction and at substantially the same velocity as the exhaust piston at the time of combustion, thereby resulting in a substantially constant volume throughout the burning period. As one can also appreciate, any number of these basic two-cylinder units can be attached by utilizing the drive shaft 60 as a common drive shaft for all units.

Referring now to FIGS. 8-10, there is shown an improvement whereby the rocker arms are spring deflectable. While only one rocker arm 24' is shown, an identical construction is provided for the opposite rocker arm; alternatively, although not preferred, the opposite rocker arm can be identical in construction to the lower rocker arm 34 as described with respect to FIG. 1. In this embodiment, all components except the ends of the rocker arms 24' and tops of the piston rods 28' and 30' are identical in structure to the corresponding components of the engine of FIG. 1.

As more clearly shown in FIG. 10, the outer ends of the rocker arms 24' are each split and formed to permit vertical displacement from the tops of the associated piston rod 28'. A cross pin 150 extends through the top of the piston rod 28' and is carried in vertical slots (one of which, 152, is shown) through opposite sides of the rocker arm end. This permits the piston rod 28' to rise vertically upwardly a short distance, defined by the vertical length of the slot 152, before pushing the rocker arm upwardly. Of course, with a two cycle engine, one or the other side is pushing the rocker arms apart; accordingly, the provision of a slot and cross pin is not critical.

A flat spring 154 has its butt end press fit into a machined slot 156 in the end of the rocker arm 24'. The opposite, loose end of the spring 154 rides on the top end of the piston rod 28'. At limitor cam 158 is secured between the split ends of the rocker arm 24' to overly the spring 154. The cam 158 is formed with a curved surface 160 facing the spring 154, chosen so that it has a greater radius of curvature than that of the normal bending curve of the spring 154. Accordingly, as the pertinent spring deflects, the point of contact between the cam 158 and spring 154 "rolls", i.e., moves, outwardly which serves to decrease the effective length of the spring 154, increasing its ability to resist deflection. The result is in effect a variable spring rate, increasing as the spring deflects, which serves to preclude pounding from excessive pressure rise.

In operation, as firing pressure increases between the pistons beyond a preset level (as determined by the characteristics of the spring 154), the spring 154 deflects as shown in somewhat exaggerated fashion, for clarity, with respect to the spring 154' in FIG. 8. The deflection allows the pistons to move apart more rapidly than would be permitted by the conventional rocker arm and crankshaft movement. As the volume between the pistons is increased the pressure is decreased. As the rocker arms move apart, the spring 154 holds the pistons apart consistent with the predetermined pressure. At the point at which the spring 154 is completely deenergized, the pistons will continue their normal sine curve travel. The effect is increased piston departure rate above the preset pressure, i.e., "dead" pistons while the springs are being deenergized, followed by normal sine curve movement. Accordingly, excess "pressure" is in effect stored in the spring 154 for use at a later stage of movement of the crank arm. This serves to increase torque and to reduce bearing loading and ring "blowby".

Referring to FIGS. 11 and 12 there are shown idealized pressure curves of cylinder pressure versus crank angle for conventional engines and engines incorporating the rocker arms of the instant invention. Neither curve is meant to correspond to any specific engine, but the curves are presented merely as a means for illustrating the invention. In FIG. 11, the engine is a spark ignition engine whereas in FIG. 12 it is a compression ignition engine. Operation of the conventional engine without ignition is shown by the lower solid line and with the ignition by the upper solid line. The effect in each case provided by the instant invention is shown by the dashed line.

Referring to FIG. 11, as an example, a spark ignition engine having a 9 1/2:1 corrected compression ration (after transfer ports are closed) will have a pre-combustion pressure of about 200 lbs./in. and a peak combustion pressure of about 550-600 lbs./in. Springs chosen to commence deflecting at 200 lbs./in. would absorb the entire pressure rise through firing by movement of the pistons away from top dead center to less than ¼ inch for a substantial amount of crankshaft movement. The spring tension will hold the pistons at that position until the crankshaft "catches up"; thereafter, the pistons will continue under normal sine curve travel. The effect of such piston movement is a substantially constant pressure of slightly over 200 lbs./in. for substantial crankshaft movement.

Referring to FIG. 12, as a further example, a compression ignition engine having a 16:1 compression ratio will have a precombustion pressure of about 450 lbs./in. and a peak combustion pressure of about 625 lbs./in. Springs chosen to commence deflecting at 450 lbs./in. also would absorb the entire pressure rise through firing for substantial crankshaft movement.

I claim:

1. In an internal combustion engine having a pair of cylinders, first and second pistons in each cylinder and oppositely acting in predetermined phase relationship so that the facing surfaces of the pistons are moved together and apart to define a stroke length and to at least partially define a combustion chamber, said pistons including piston rods extending outwardly therefrom, means for providing fuel to said combustion chamber, a transfer port in each cylinder, opened and closed by one of said pistons and providing air to said combustion chamber, an exhaust port in each cylinder for removing combustion products from said combustion chamber, a pivotally mounted first rocker arm having opposite ends arranged for reciprocal movement of said first pistons, means arranged for reciprocal movement with said second pistons, and a crankshaft rotatably driven by pivotal movement of said rocker arm, the improvement comprising:
a spring member carried on each end of said rocker arm, said spring member having a substantially planar surface bearing against the outer end of the respective piston rod so as to be interposed between said rocker arm and each piston whereby to permit said pistons to move apart by deflecting the respective spring, during combustion, in advance of said crankshaft.

2. In an internal combustion engine having a pair of cylinders, first and second pistons in each cylinder and oppositely acting in predetermined phase relationship, so that the facing surfaces of the pistons are moved together and apart to define a stroke length and to at least partially define a combustion chamber, said pistons including piston rods extending outwardly therefrom, means for providing fuel to said combustion chamber, a transfer port in each cylinder, opened and closed by one of said pistons and providing air to said combustion chamber, an exhaust port in each cylinder for removing combustion products from said combustion chamber, a pivotally mounted first rocker arm having opposite ends arranged for reciprocal movement of said first pistons, means arranged for reciprocal movement with said second pistons, and a crankshaft rotatably driven by pivotal movement of said rocker arm, the improvement comprising:
a flat spring carried on each end of said rocker arm and in contact with the outer end of the respective piston rod so as to be interposed between said rocker arm and each said piston whereby to permit said pistons to move apart by deflecting the respective spring, during combustion, in advance of said crankshaft.

3. The improvement of claim 2 including limiting means for decreasing the effective length of said spring as said spring is deflected.

4. The improvement of claim 3 in which said limiting means comprises a curved cam surface having a radius of curvature greater than that of the normal bending curve of said spring whereby the point of contact between said cam surface and said spring moves outwardly to decrease the effective length of said spring.

* * * * *